United States Patent
Kulkarni et al.

(10) Patent No.: US 8,922,707 B2
(45) Date of Patent: Dec. 30, 2014

(54) SYSTEMS AND METHODS FOR LUMINANCE-BASED SCENE-CHANGE DETECTION FOR CONTINUOUS AUTOFOCUS

(75) Inventors: Prajit Kulkarni, San Jose, CA (US); Sheng Lin, San Jose, CA (US); David R. Pope, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 576 days.

(21) Appl. No.: 13/208,262

(22) Filed: Aug. 11, 2011

(65) Prior Publication Data

US 2012/0188386 A1 Jul. 26, 2012

Related U.S. Application Data

(60) Provisional application No. 61/436,558, filed on Jan. 26, 2011.

(51) Int. Cl.
H04N 5/232 (2006.01)
G03B 13/00 (2006.01)
H04N 5/228 (2006.01)

(52) U.S. Cl.
CPC .................. H04N 5/23212 (2013.01)
USPC ..................... 348/352; 348/208.12

(58) Field of Classification Search
USPC ........................... 348/208.12, 352
See application file for complete search history.

(56) References Cited

U.S. PATENT DOCUMENTS 7,787,015 B2 * 8/2010 Stavely ................ 348/208.1
8,274,596 B2 * 9/2012 Pincenti et al. .............. 348/349
2009/0148146 A1 * 6/2009 Maeda ............................. 396/89
2010/0079601 A1 * 4/2010 Chiang et al. .............. 348/208.1
2010/0111185 A1 * 5/2010 Yokoyama ............... 375/240.16

OTHER PUBLICATIONS

Itami et al., "A Change Detection Method for Image Sequences Based on Physical Models", IEICE Trans Fundamentals, vol. E88-A. No. 8, Aug. 2005, pp. 2100-2107.
Yi et al., "Fast Pixel-Based Video Scene Change Detection", Oct. 20, 2011, pp. 3443-3446.
"A Change Detection Method for Image Sequences Based on Phsyical Models" Itami et al., "Fast Pixel-Based Video Scene Change Detection", IEICE Trans Fundamentals, vol. E88-A. No:8, Aug. 2005, pp. 2100-2107.
Huang et al., "A Robust Scene-Change Detection Method for Video Segmentation", Transactions on Circuits and Systems for Video Technology, vol. 11, No. 12, Dec. 2001, pp. 1281-1288.
Toth et al., "Illumination—Invariant Change Detection", Institute for Signal Processing, University of Lubeck, Apr. 2000.
Lee et al., "An Advanced Video Camera System with Robust AF, AE, and AWB Control", Department of Electronics Engineering, Korea University, Aug. 2001.
Shih, "Autofocus survey: A comparison of algorithms", SPIE-IS&T Electronic Imaging, SPIE vol. 6502, 65020B, Feb. 2007.
Lu et al., "Robust Gradual Scene Change Detection", Department of Electronic Engineering, Tsinghua University Beijing, Oct. 2008.

* cited by examiner

*Primary Examiner* — Albert Cutler
(74) *Attorney, Agent, or Firm* — Treyz Law Group (57) ABSTRACT

Imaging systems with image sensors and image processing circuitry are provided. The image processing circuitry may identify motion and perform autofocus (e.g., continuous autofocus) using images captured by an image sensor. Auto exposure metrics such as average luminance values and autofocus statistics such as sharpness scores may be calculated for each image. The auto exposure metrics may be used to calculate motion scores and identify directional motion between a series of captured images. The motion scores may be used with the sharpness scores to determine when to perform autofocus functions such as when to refocus a lens for a continuous autofocus application. For example, the motion scores may be monitored to identify motion that exceeds a given magnitude and duration. After identification of motion, motion scores and sharpness scores may be used to determine when a given scene has stabilized and when the lens should be refocused.

11 Claims, 8 Drawing Sheets

$$SSAD_1 = \sum_{i=1}^{4} \sum_{j=1}^{3} \left| Z_{ref}(i,j) - Z_{cur}(i,j+1) \right|$$

FIG. 4A $$SSAD_2 = \sum_{i=1}^{4} \sum_{j=1}^{3} \left| Z_{ref}(i,j+1) - Z_{cur}(i,j) \right|$$

SYSTEMS AND METHODS FOR LUMINANCE-BASED SCENE-CHANGE DETECTION FOR CONTINUOUS AUTOFOCUS

This application claims the benefit of provisional patent application No. 61/436,558, filed Jan. 26, 2011, which is hereby incorporated by reference herein in its entirety.

BACKGROUND

This relates generally to imaging systems, and more particularly, imaging systems that can perform continuous autofocus functions.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format. Imagers may calculate automatic exposure values (sometimes referred to herein as auto exposure values or auto exposure metrics) for automatically configuring exposure settings (e.g., the amount of time that the image sensing pixels receive incident light) for capturing images.

An imaging system may include an adjustable lens for focusing light onto an array of image sensing pixels. Imaging systems with an adjustable focal lens may use autofocus (AF) algorithms to configure the adjustable focal lens for optimal image sharpness.

The imaging system may perform autofocus functions to determine an optimum lens configuration for a given image scene. The autofocus functions may be performed in response to a manual trigger or performed continuously. Autofocus (AF) procedures performed continuously (sometimes referred to herein as continuous autofocus) may re-focus the lens to accommodate change in a scene being captured. For example, a video imaging system that performs continuous autofocus may re-focus a lens to accommodate movement of an object within the view of the video imaging system (i.e., movement of an object across frames captured by the video imaging system).

Performing continuous autofocus functions may cause an imaging system to consume large amounts of power. For example, re-focusing a lens consumes power associated with mechanically adjusting the lens. Autofocus functions in conventional imagers are sensitive to minor variations in a given image scene and perform excessive lens refocusing procedures (e.g., when a minor variation in the given scene should not require the lens to be refocused). Therefore it would be desirable to design an imaging system that performs improved autofocus functions.

DETAILED DESCRIPTION

Figure 1:
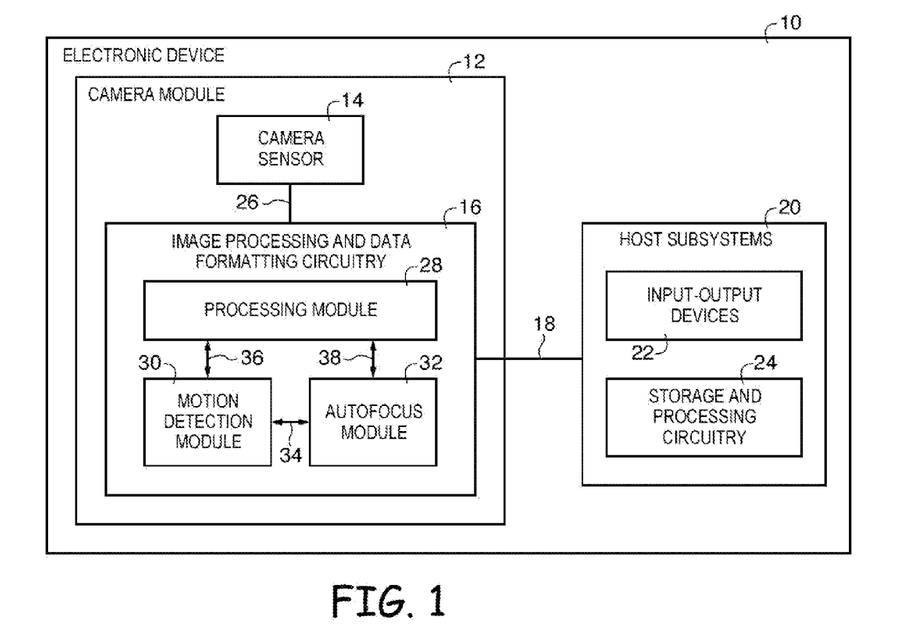
FIG. 1 is a diagram of an illustrative electronic device that may include an imager that may perform continuous autofocus functions in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Image processing and data formatting circuitry 16 may contain an autofocus module 32 that performs autofocus functions. Autofocus module 32 may perform autofocus scans on images captured by camera sensor 14 to determine an optimum configuration for a camera lens associated with camera module 12. For example, autofocus module 32 may configure camera sensor 14 to capture images of a given scene at various lens positions and calculate focus (e.g., sharpness) scores for each of the images captured. Autofocus module 32 may use the calculated focus scores to determine which of the various lens positions is optimal for capturing images for that given scene.

Camera module 12 may contain a motion detection module for identifying motion in video data captured by camera sensor 14 (e.g., a sequence of frames captured by camera sensor 14). For example, motion detection module 30 may identify motion when an object moves across a given scene or when the camera sensor is directed towards a different portion of a scene (e.g., if the camera module is moved). Motion detection module 30 may be coupled to autofocus module 32 via path 34 and to a processing module 28 via path 36. Motion detection module 30 may convey information associated with the detection of motion to processing module 28 via path 36 and to autofocus module 32 via path 34.

Processing module 28 may provide control signals to motion detection module 30 via path 36 and to autofocus module 32 via path 38. For example, processing module 28 may receive information associated with the detection of motion from motion detection module 30 and use the received information to determine whether a refocus of the camera lens is required and send appropriate control signals to autofocus module 32. Processing module 28 may calculate auto-exposure metrics such as zone luminance values and convey the auto-exposure metrics to motion detection module 30 and autofocus module 32 via paths 36 and 38.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
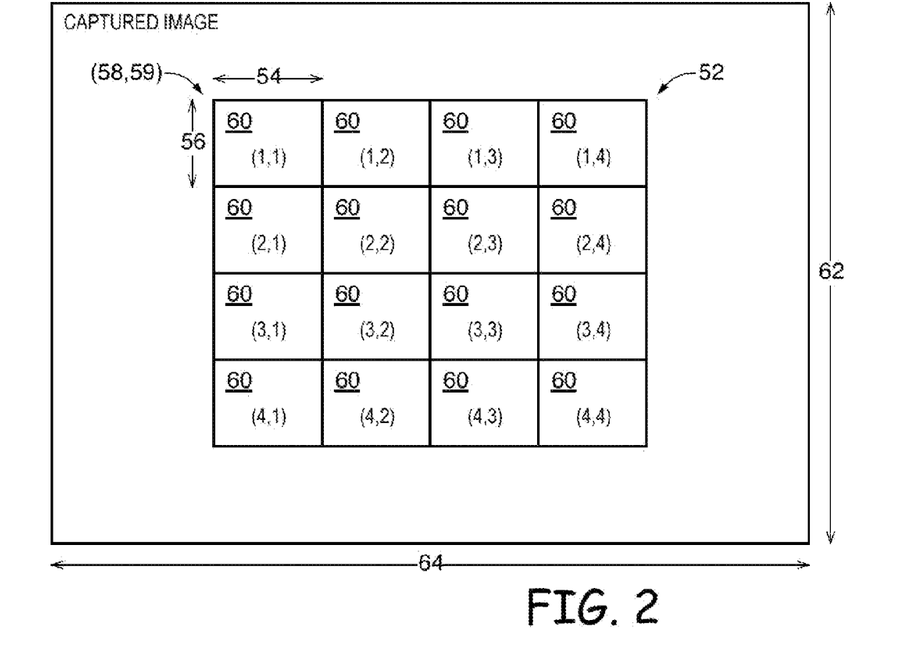
FIG. 2 is a diagram of an illustrative frame within an image captured by an imager of the type shown in FIG. 1 in accordance with an embodiment of the present invention.

Camera sensor 14 may be configured to capture an image and send the captured image to image processing circuitry 16 over path 26. FIG. 2 shows an example of a captured image such as captured image 50 that may have width 64 and height 62 and that may be received by image processing circuitry 16 from camera sensor 14. Width 64 may correspond to a first given number of pixels and height 62 may correspond to a second given number of pixels. A rectangular window 52 (sometimes referred to herein as a frame) may be located at pixel coordinates (58, 59) in captured image 50. Pixel coordinates (58, 59) may represent the location of window 52 within captured image 50. Window 52 may be divided into rows and columns of rectangular sub-blocks 60. Sub-blocks 60 may sometimes be referred to herein as zones. Each zone may sometimes be referred to herein by its respective coordinates. For example, the zone corresponding to the first row and first column may be referred to as zone(1,1) and the zone corresponding to the second row and third column may be referred to as zone(2,3). Zones 60 may each have a height 56 and a width 54. Width 54 may correspond to a first given number of pixels and height 56 may correspond to a second given number of pixels. Zones 60 may partition window 52 into equally sized portions, as one example. Window 52 may be an area of interest in captured image 50 in which it is desirable to calculate autofocus metrics. Image processing circuitry 16 may be configured to calculate autofocus metrics for a region such as window 52.

Figure 3:
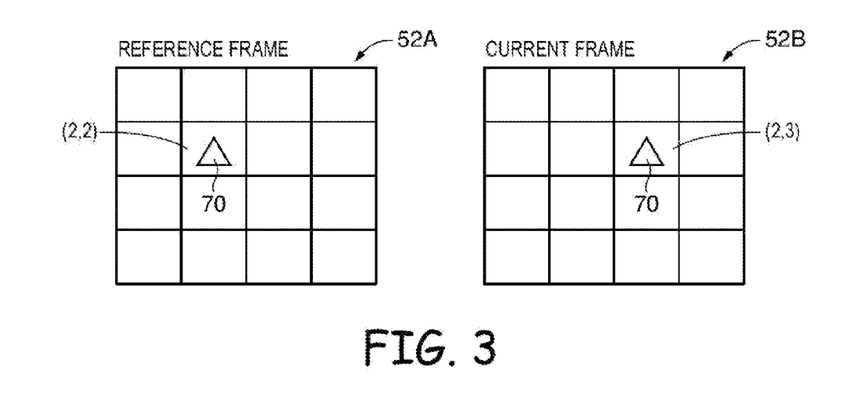
FIG. 3 is a diagram illustrating scene changes between successive frames due to motion of an object in accordance with an embodiment of the present invention.

Camera sensor 14 may be configured to capture video data (i.e., a sequence of image frames). FIG. 3 shows two illustrative frames such as frames 52A and 52B from a sequence of image frames captured by an image sensor 14 from a given scene. During capture of the video data, an object 70 may move across the scene. For example, object 70 may be located in zone(2,2) in a reference frame such as frame 52A (e.g., a first frame captured in the sequence of image frames). Object 70 may move to the right and may be located in zone(2,3) in a subsequent frame such as frame 52B (e.g., while image sensor 14 is capturing video).

Figure 4A:
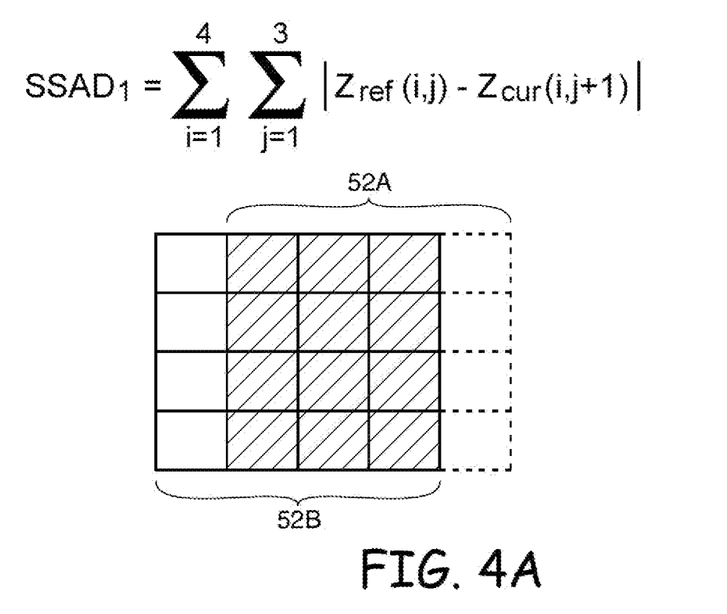
FIGS. 4A, 4B, 4C, and 4D are diagrams illustrating the calculations of four directional shifted sum of absolute difference (SSAD) values in accordance with an embodiment of the present invention.

Motion detection module 30 may determine motion by calculating, as an example, shifted sum of absolute difference (SSAD) metrics from sequentially captured images. As shown in the example of FIG. 4A, a first SSAD metric (e.g., $SSAD_1$) may be calculated from a reference frame 52A and a frame 52B (e.g., a current frame). Frames 52A and 52B may each be divided into 16 zones arranged in 4 rows and 4 columns. Frame 52B may be captured sequentially after reference frame 52A. SSAD metric $SSAD_1$ may be calculated by forming groups of zones within reference frame 52A and frame 52B. A first group may be formed from the zones in reference frame 52A corresponding to the first four rows and the first three columns (e.g., rows 1-4 and columns 1-3 of reference frame 52A). A second group may be formed from the zones in frame 52B corresponding to the first four rows and last three columns (e.g., rows 1-4 and columns 2-4 of frame 52B). Motion detection module 30 may receive zone luminance values from processing module 28. The zone luminance values may be based on luminance values captured by the pixels corresponding to each zone (e.g., imaging data). SSAD metric $SSAD_1$ may be calculated from the absolute value of the difference between the average zone luminance values (e.g., $Z_{ref}$ or other auto exposure values) of the first group and the average zone luminance values (e.g., $Z_{cur}$) of the second group.

SSAD metric $SSAD_1$ may reflect leftward movement of camera module 12. For example, if camera module 12 moves to the left (e.g., by a distance corresponding to the width of a zone) between the capture of reference frame 52A and frame 52B, the overlap between frame 52B and reference frame 52A (e.g., as shown by the hatched portion of FIG. 4A) may reflect the portion of a given scene that remains constant between the reference frame and the current frame. SSAD metric $SSAD_1$ calculated for the reference frame 52A and frame 52B may have a small value (e.g., close to zero) when camera module 12 moves to the left between the capture of reference frame 52A and frame 52B. SSAD metric $SSAD_1$ may have a larger value when camera module 12 moves in other directions or remains motionless (e.g., the overlap between the frame 52B and reference frame 52A may not reflect a portion of the given scene that remains constant). The selection of the first group and second group may correspond to shifting frame 52B left by, as an example, one column relative to reference frame 52A and calculating SSAD metric $SSAD_1$ based on luminance values from the overlap between the two frames.

Figure 4B:
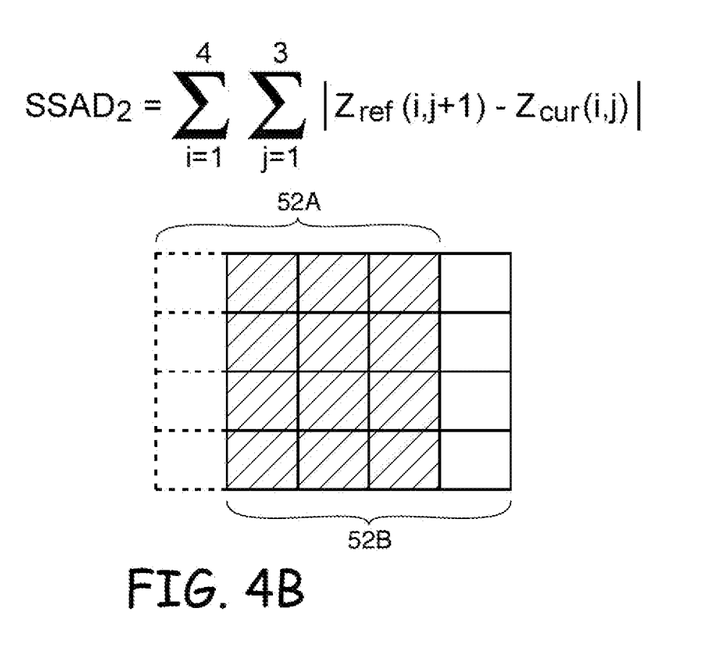

In the example of FIG. 4B, a second SSAD metric (e.g., $SSAD_2$) may be calculated from reference frame 52A and frame 52B. SSAD metric $SSAD_2$ may be calculated by forming groups of zones within reference frame 52A and frame 52B. A first group may be formed from the zones in reference frame 52A corresponding to the first four rows and the last three columns (e.g., rows 1-4 and columns 2-4 of reference frame 52A). A second group may be formed from the zones in frame 52B corresponding to the first four rows and first three columns (e.g., rows 1-4 and columns 1-3 of frame 52B). SSAD metric $SSAD_2$ may be calculated from the absolute value of the difference between the average zone luminance values (e.g., $Z_{ref}$ or other auto exposure values) of the first group and the average zone luminance values (e.g., $Z_{cur}$) of the second group.

SSAD metric $SSAD_2$ may reflect rightward movement of camera module 12 (e.g., leftward movement of a scene being captured). For example, if camera module 12 moves to the right (e.g., by a distance corresponding to the width of a zone) between the capture of reference frame 52A and frame 52B, the overlap between frame 52B and reference frame 52A (e.g., as shown by the hatched portion of FIG. 4B) may reflect a portion of the given scene that remains constant between the reference frame and the current frame. SSAD metric $SSAD_2$ calculated for the reference frame 52A and frame 52B may have a small value (e.g., close to zero) when camera module 12 moves to the right between the capture of reference frame 52A and frame 52B. SSAD metric $SSAD_2$ may have a larger value when camera module 12 moves in other directions or remains motionless (e.g., the overlap between the frame 52B and reference frame 52A may not reflect a portion of the given scene that remains constant). The selection of the first group and second group may correspond to shifting frame 52B right by one column relative to reference frame 52A and calculating SSAD metric $SSAD_2$ based on luminance values from the overlap between the two frames.

Figure 4C:
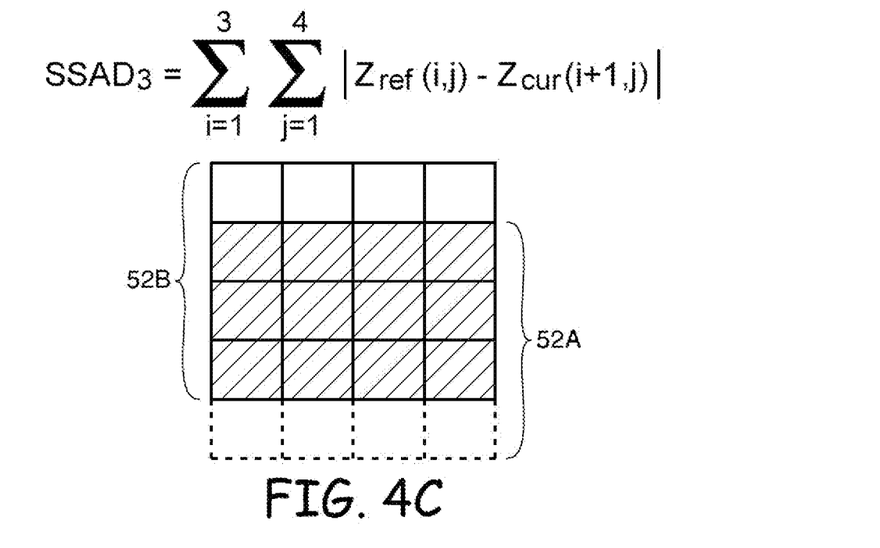

In the example of FIG. 4C, a third SSAD metric (e.g., $SSAD_3$) may be calculated from reference frame 52A and frame 52B. SSAD metric $SSAD_3$ may be calculated by forming groups of zones within reference frame 52A and frame 52B. A first group may be formed from the zones in reference frame 52A corresponding to the first three rows and the four columns (e.g., rows 1-3 and columns 1-4 of reference frame 52A). A second group may be formed from the zones in frame 52B corresponding to the last three rows and four columns (e.g., rows 2-4 and columns 1-4 of frame 52B). SSAD metric $SSAD_3$ may be calculated from the absolute value of the difference between the average zone luminance values (e.g., $Z_{ref}$ or other auto exposure values) of the first group and the average zone luminance values (e.g., $Z_{cur}$) of the second group.

SSAD metric $SSAD_3$ may reflect upward movement (e.g., downward movement of a scene or downward movement of objects in a scene) of camera module 12. For example, if camera module 12 moves up between the capture of reference frame 52A and frame 52B, the overlap between frame 52B and reference frame 52A (e.g., as shown by the hatched portion of FIG. 4C) may reflect a portion of the given scene that remains constant between the reference frame and the current frame. SSAD metric $SSAD_3$ calculated for the reference frame 52A and frame 52B may have a small value (e.g., close to zero) when camera module 12 moves up between the capture of reference frame 52A and frame 52B. SSAD metric $SSAD_3$ may have a larger value when camera module 12 moves in other directions or remains motionless (e.g., the overlap between the frame 52B and reference frame 52A may not reflect a portion of the given scene that remains constant). The selection of the first group and second group may correspond to shifting frame 52B up by one column relative to reference frame 52A and calculating SSAD metric $SSAD_3$ based on luminance values from the overlap between the two frames.

Figure 4D:
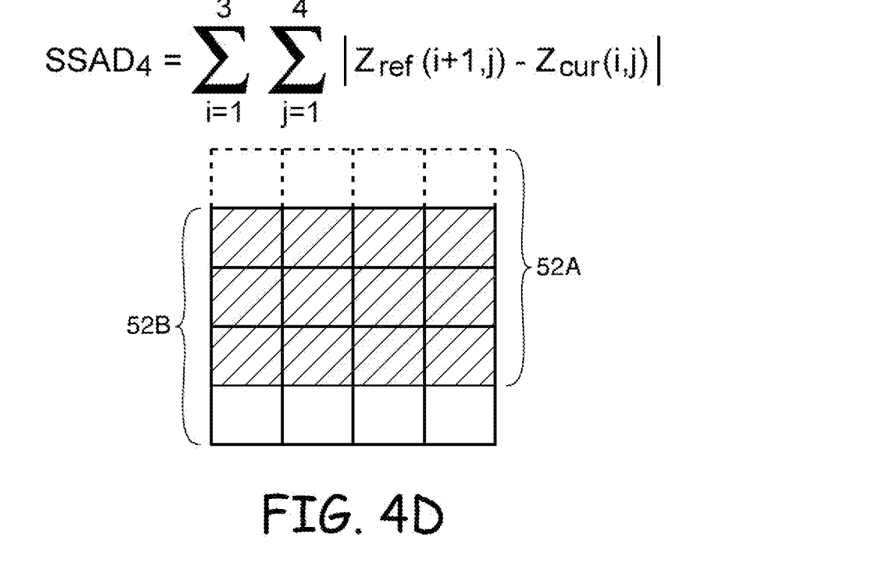

In the example of FIG. 4D, a fourth SSAD metric (e.g., $SSAD_4$) may be calculated from reference frame 52A and frame 52B. SSAD metric $SSAD_4$ may be calculated by forming groups of zones within reference frame 52A and frame 52B. A first group may be formed from the zones in reference frame 52A corresponding to the last three rows and the four columns (e.g., rows 2-4 and columns 1-4 of reference frame 52A). A second group may be formed from the zones in frame 52B corresponding to the first three rows and four columns (e.g., rows 1-3 and columns 1-4 of frame 52B). SSAD metric $SSAD_4$ may be calculated from the absolute value of the difference between the average zone luminance values (e.g., $Z_{ref}$ or other auto exposure values) of the first group and the average zone luminance values (e.g., $Z_{cur}$) of the second group.

SSAD metric $SSAD_4$ may reflect downward movement of camera module 12. For example, if camera module 12 moves down between the capture of reference frame 52A and frame 52B, the overlap between frame 52B and reference frame 52A (e.g., as shown by the hatched portion of FIG. 4D) may reflect a portion of the given scene that remains constant between the reference frame and the current frame. SSAD metric $SSAD_4$ calculated for the reference frame 52A and frame 52B may have a small value (e.g., close to zero) when camera module 12 moves down between the capture of reference frame 52A and frame 52B. SSAD metric $SSAD_3$ may have a larger value when camera module 12 moves in other directions or remains motionless (e.g., the overlap between the frame 52B and reference frame 52A may not reflect a portion of the given scene that remains constant). The selection of the first group and second group may correspond to shifting frame 52B down by one column relative to reference frame 52A and calculating SSAD metric $SSAD_4$ based on luminance values from the overlap between the two frames.

The selection of groups for the calculation of SSAD metrics $SSAD_1$-$SSAD_4$ is merely illustrative. The first and second groups may be selected to correspond to shifts of one row, two rows, one column, two columns, or any variation desired for calculation of the SSAD metrics. The first and second group may each be arranged with four rows and four columns, 5 rows and 5 columns, or any combination of rows and columns desired for calculation of the SSAD metrics.

Figure 5:
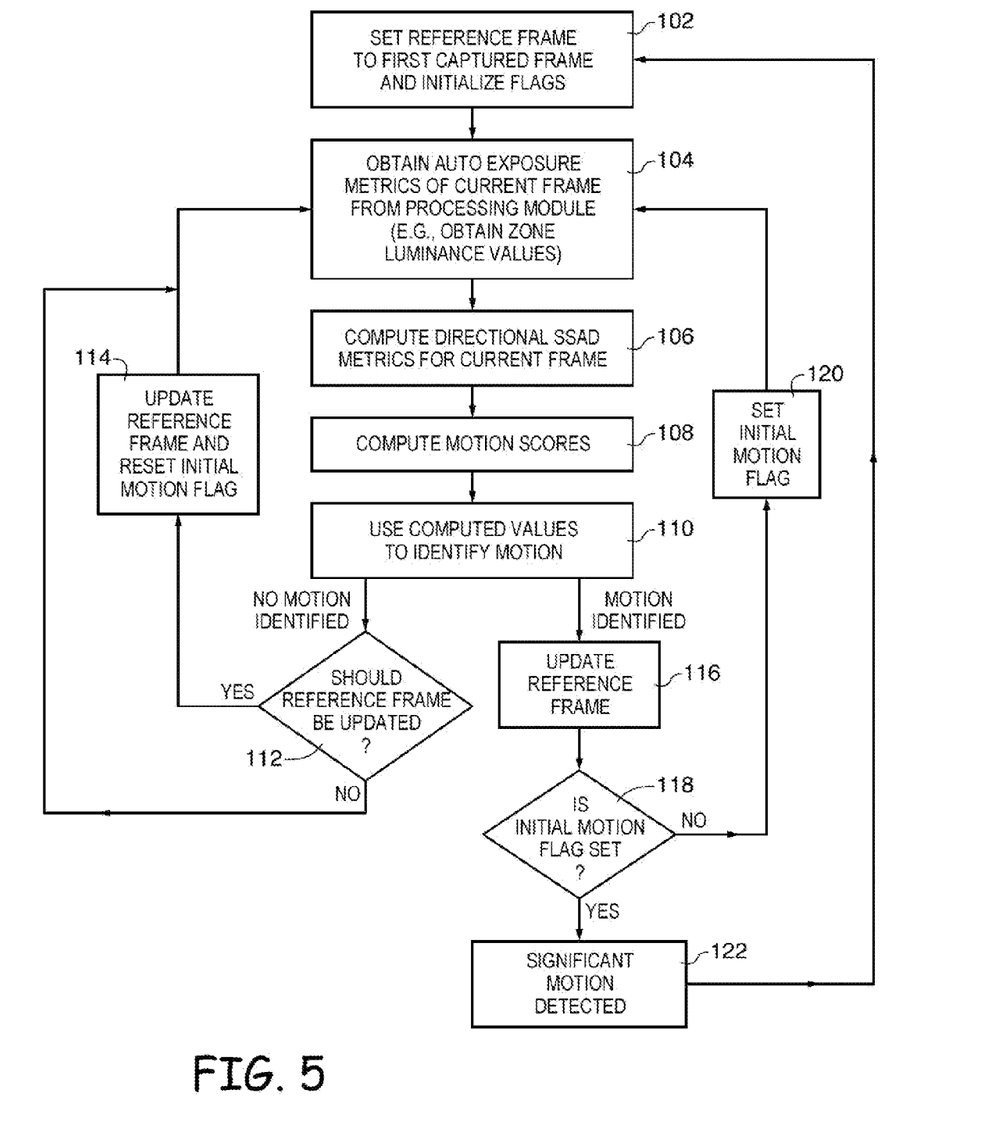
FIG. 5 is a flow chart of illustrative steps involved in identifying motion by monitoring successive frames in accordance with an embodiment of the present invention.

Motion detection module 30 may receive the sequence of image frames (e.g., video data) and use metrics such as SSAD metrics $SSAD_1$-$SSAD_4$ to identify whether or not motion has occurred within the sequence of image frames (e.g., if an object 70 moves from zone(2,2) to zone(2,3) or if the camera lens has been moved). FIG. 5 shows illustrative steps involved with identifying motion within a sequence of image frames using SSAD metrics $SSAD_1$-$SSAD_4$. The illustrative steps of FIG. 5 may sometimes be referred to as a camera motion recognition algorithm (CMRA).

During the operations of step 102, a reference frame may be set to a first captured frame of a sequence of frames. An initial motion flag identifying an initial detection of motion in a particular direction may be reset (e.g., set to zero or false for each direction of motion).

During the operations of step 104, statistical metrics such as auto exposure metrics of the current frame may be obtained from processing module 28 (e.g., processing module 28 may compute auto exposure metrics such as zone luminance values for each zone 60 of frame 52 and convey the auto exposure metrics to motion detection module 30 via path 36).

During the operations of step 106, directional shifted sum of absolute difference (SSAD) metrics may be calculated for a current frame. Four directional SSAD metrics (e.g., SSAD values corresponding to rightward camera movement, leftward camera movement, upward camera movement, and downward camera movement) may be calculated (e.g., according to the arrangements of FIGS. 4A, 4B, 4C, and 4D).

During the operations of step 108, motion scores based on the four directional SSAD values may be calculated. To calculate the motion scores, directional reference SSAD values may be calculated for each of the four directional SSAD values. The directional reference SSAD values may be calculated by repeating the calculations of the four directional SSAD values with the current frame replaced by the reference frame (e.g., by replacing luminance values $Z_{cur}$ with $Z_{ref}$ in the equations of FIGS. 4A, 4B, 4C, and 4D). The calculation of the directional reference SSAD values may sometimes be referred to as performing directional auto-correlation. The reference SSADs may provide baseline reference values (e.g., the reference SSADs may indicate expected SSAD values in the absence of motion).

As shown in equation 1, each motion score (sometimes referred to as an SSAD reduction value or an SR value) may be calculated by subtracting a directional SSAD value from a corresponding reference SSAD value and normalizing the difference by the reference SSAD value (e.g., because directional SSAD values that are close in magnitude to corresponding reference SSAD values reflect scenes with no significant motion). For example, to calculate the motion score associated with rightward camera motion, motion detection module 30 may subtract the rightward SSAD value SSAD(2) from the rightward reference SSAD value $SSAD_{ref}(2)$ and divide the result by the rightward reference SSAD value.

$$SR(k) = (SSAD_{ref}(k) - SSAD(k))/SSAD_{ref}(k) \quad (1)$$

Each directional reference SSAD value may be calculated from a reference frame against itself (e.g., by calculating directional SSAD metrics for the reference frame against itself). Each directional SSAD value may be calculated from a current frame against a reference frame (e.g., by calculating directional SSAD metrics for the current frame against the reference frame).

A final motion score may be calculated from the two motion scores with the highest values (e.g., the motion scores associated with the two directions that have the most camera movement). If the second highest value is greater than zero, the final motion score may be calculated from the difference between the two highest directional motion scores. By subtracting the second highest directional motion score from the highest directional motion score, the final motion score may be calculated to reflect a dominant direction of motion. If the second highest value is less than zero, the final motion score may be set equal to the highest value (e.g., because a second highest motion score that is negative may indicate that no motion is occurring in the direction associated with the second highest motion score).

The final motion score may be conveyed from motion detection module 30 to processing module 28 via path 36 or to autofocus module 32 via path 34. The final motion score may be used by processing module 28 to assist in autofocus functions (e.g., determining when to refocus a lens).

During the operations of step 110, the final motion score may be used to identify whether or not motion has occurred in the sequence of captured images. If the final motion score is greater than a motion threshold value, motion between the reference frame and current frame is identified. If motion is identified in step 110, processing may move to step 116. If motion is not identified (e.g., if the final motion score is less than the motion threshold value), processing may move to step 112.

During the operations of step 112, motion detection module 30 may determine whether or not the reference frame should be updated. To choose an optimal reference frame for use in motion detection, motion detection module 30 may perform several calculations.

Motion detection module 30 may calculate directional SSAD values for the current frame in reference to itself (i.e., by replacing $Z_{ref}$ with $Z_{cur}$ in the equations of FIGS. 4A, 4B, 4C, and 4D). If the minimum of the four calculated directional SSAD values for the current frame in reference to itself is greater than the minimum reference SSAD value (i.e., the current frame has more luminance deviation among its zones than the luminance deviation among the zones of the reference frame), the reference frame may be updated to the current frame. By updating the reference frame, which has less luminance deviation than the current frame, detection of motion in future frames may be improved (e.g., a reference frame with more luminance deviation may provide additional and desirable variance when calculating motion scores).

Motion detection module 30 may, additionally or alternatively, use a timer to determine whether or not to update the reference frame. For example, motion detection module 30 may be configured with a threshold timer value and may update the reference frame with the current frame when the timer exceeds the threshold timer value.

The reference frame may be updated with the current frame if the final motion score is less than zero. If the final motion score is less than zero (i.e., if each of the motion scores is less than zero), then each of the directional SSAD metrics may be greater than the corresponding reference SSAD metric (e.g., the SSAD metrics for the current frame that correspond to rightward motion, upward motion, downward motion, and leftward motion may each be larger than a corresponding directional SSAD metric for the reference frame). For example, in the case that the entire scene has changed, the current frame may reflect a scene with different average luminance values from the reference scene. In this case, the directional SSAD metrics may have relatively large values (i.e., values larger than the corresponding directional reference SSAD metrics) and it may be desirable to use the current frame for calculating future motion scores.

If motion detection module 30 determines that the reference frame should be updated with the current frame, the process moves to step 114. If motion detection module 30 determines that the reference frame should be maintained, the process may return to step 104.

During the operations of step 114, the reference frame may be updated to correspond with the current frame. The reference frame may be updated by replacing the auto exposure values (e.g., average luminance values) of each zone by the auto exposure values of a corresponding zone in the current frame. The initial motion flag identifying an initial detection of motion may be reset (e.g., set to zero or false for the direction of detected motion). The process may then return to step 104.

If motion is identified in step 110, the operations of step 116 may be performed. During the operations of step 116, the reference frame may be updated to correspond to the current frame (e.g., the average luminance value of each zone of the reference frame may be replaced by the average luminance value of each zone of the current frame). The process may then move to step 118.

During the operations of step 118, the status of the initial motion flag may be examined. If the initial motion flag identifies that initial motion has already occurred in the same direction as the motion detected for the current frame, the process moves to step 122. For example, if the initial motion flag identifies that upward motion has recently occurred and upward motion has been detected for the current frame, then significant motion has been detected (e.g., motion in the same direction has been sequentially detected). If the initial motion flag is not set (e.g., the value of the initial motion flag identifies that no motion has occurred) or the initial motion flag identifies that initial motion has occurred in a direction other than the direction detected for the current frame, the process moves to step 120.

During the operations of step 120, the initial motion flag may be set (e.g., to identify the direction of the motion detected in step 110) and the process may return to step 104.

During the operations of step 122, significant motion may be identified. Motion detection module 30 may, as an example, output a signal identifying the detection of significant motion along with the calculated final motion score to autofocus module 32 via path 34 and to processing module 28 via path 36. The process may then loop back to step 102 to detect motion for subsequent frames.

The final motion scores and detection of significant motion for a sequence of frames (e.g., video data) may be used to assist in autofocus functions. For example, the detection of motion may be used with the values of final motion scores and sharpness (focus) scores to determine when a lens should be refocused. Image processing circuitry 16 may use the camera motion recognition algorithm (CMRA) to determine when a lens should be refocused.

Figure 6A:
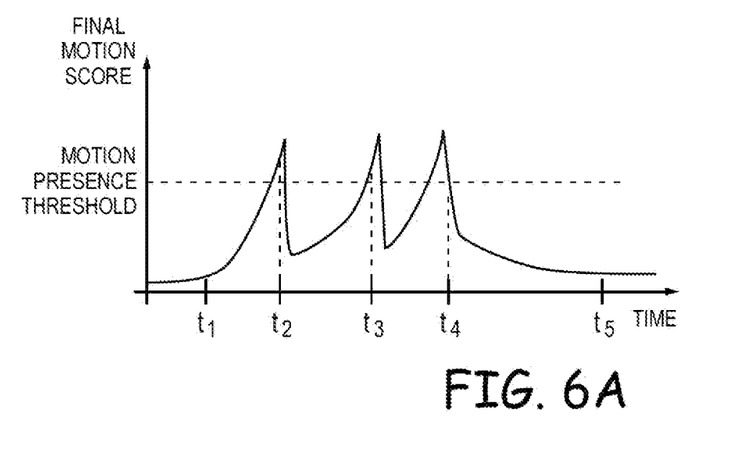
FIG. 6A is a diagram illustrating changes in a motion score that may cause an imager to perform a lens re-focus procedure in accordance with an embodiment of the present invention.
Figure 6B:
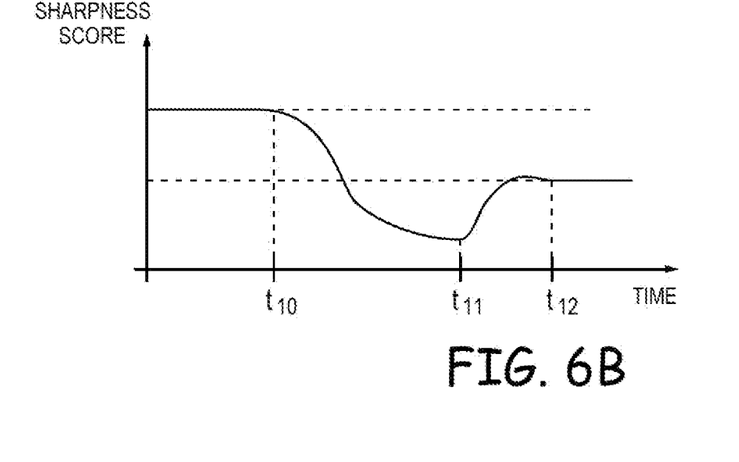
FIG. 6B is a diagram illustrating changes in a motion score that may not cause an imager to perform a lens re-focus procedure in accordance with an embodiment of the present invention.
Figure 6C:
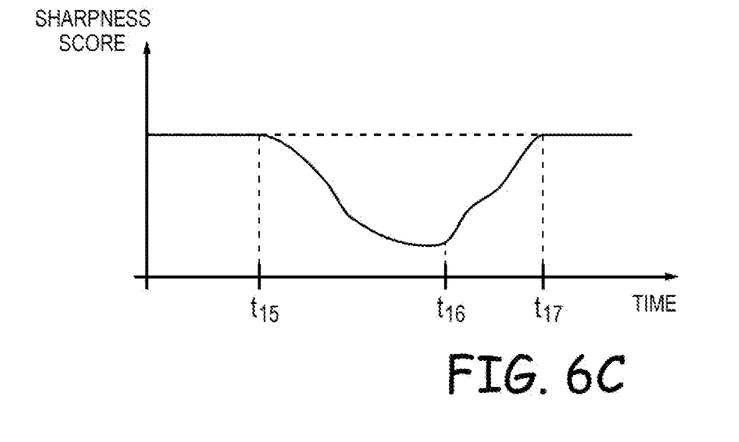
FIG. 6C is a diagram illustrating a scenario in which a new stable sharpness score is of similar magnitude to an old sharpness score in accordance with a embodiment of the present invention.

FIGS. 6A, 6B and 6C illustrate scenarios in which a scene-change detection algorithm may use the camera motion recognition algorithm (CMRA) to identify when a lens should be refocused. The CMRA may monitor the final motion scores of a given scene for successive frames (e.g., video data) over time. Motion detection module 30 may produce a significant motion signal using the CMRA. The significant motion signal may be used as at least one factor in determining when to refocus a lens.

Before time t1, the scene may be still (e.g., the final motion scores for frames before time t1 may be constant) and the final motion scores for frames during this time may be low (e.g., close to zero).

At time t1, significant motion may occur in the scene and a corresponding significant motion signal may be conveyed from motion detection module 30 to processing module 28. Processing module 28 may begin monitoring the final motion scores of each captured frame at time t1.

At time t2, the processing module 28 may detect that the final motion score for the frame captured at time t2 is greater than a motion presence threshold. The final motion score may correspond to a normalized value (e.g., the difference between a directional SSAD metric and a reference directional SSAD metric normalized by the reference directional SSAD metric). In this case, the value of the motion presence threshold may reflect a percentage threshold (e.g., if the value of the motion presence threshold is 0.125, then the difference between the directional SSAD metric and the reference directional SSAD metric may be greater than 12.5% of the reference directional SSAD metric). The value of the motion presence threshold may be 0.125 or other values appropriate for identifying the presence of motion (as an example). The motion presence threshold may be configured with a large value (e.g., close to 1) so that the camera motion recognition algorithm (CMRA) responds only to motions of larger magnitude. The motion presence threshold may be configured with a small value (e.g., close to 0) so that the camera motion recognition algorithm (CMRA) responds to motions of smaller magnitude. At this time, processing module 28 may enable a motion counter. The value of the motion counter may identify how many times the final motion score exceeds the motion presence threshold before the scene stabilizes. A stable scene may be identified when the motion score stays below the motion presence threshold for a fixed (stable counter threshold) consecutive number of frames.

The final motion score does not need to be higher than the motion presence threshold on consecutive frames. Whenever the motion presence threshold is exceeded, the reference frame is updated. By updating the reference frame, a final motion score calculated for the next frame may be smaller than the final motion score of the current frame (e.g., the final motion score calculated at a time immediately after t2 may be smaller than the final motion score calculated at t2). If motion in the scene continues to occur, the score may increase from time t2 to t3.

At time t3, the value of the motion counter may exceed a motion counter threshold (e.g., the number of times that the final motion score exceeds the motion presence threshold after motion begins (e.g., after motion begins at time t1) may exceed the motion counter threshold). The motion counter threshold may determine the number of times that the final motion score must exceed the motion presence threshold before the system determines that the lens may need to be refocused. For example, the motion counter threshold may be set to 2. The motion counter threshold may be configured with a large value (e.g., 10 or more) so that the scene-change detection algorithm only responds to motions of longer duration and of a minimum magnitude for that duration. The motion counter threshold may be configured with a small value (e.g., 2) so that the scene-change detection algorithm responds to motions of shorter duration. At time t3, processing module 28 may set a motion flag identifying the presence of motion.

From time t3 to t4, motion in the scene may continue to occur. During this time, the processing module may continue to calculate final motion scores. Processing module 28 may have already detected the presence of motion at time t3 (e.g., because the motion counter exceeded the motion counter threshold value at time t3) and may wait for the final motion score to remain below the motion presence threshold for a minimum number of frames before responding to the detection of motion (e.g., processing module 28 may wait for the motion in the scene to decrease below the motion presence threshold and remain below the motion presence threshold for a predetermined amount of time before resuming lens refocusing operations). A stable counter may be used to identify for how many frames the final motion score has remained below the motion presence threshold.

Additional constraints may be added to the algorithm. For example, to account for the case where the amount of time between t3 and t2 is relatively large, an upper bound may be placed on the maximum time between any two consecutive detections of motion (e.g., if the amount of time between t3 and t2 exceeds the maximum time, the motion flag may not be set). The upper bound restriction may be implemented via a time-out counter that is initialized to a value that corresponds to the maximum time.

At time t4, the final motion score may decrease below the motion presence threshold. At this time, processing module 28 may enable the stable counter. The value of the stable counter may identify how long (e.g., how many frames) the final motion score remains less than the motion presence threshold. To identify how many frames for which the final motion score remains less than the motion presence threshold, the stable counter may be incremented for every captured frame after time t4.

At time t5, the value of the stable counter may exceed a stable counter threshold (e.g., the number of frames captured between time t4 and t5 may exceed the stable counter threshold). In other words, the final motion score has decisively dropped below the motion presence threshold. The stable counter threshold may determine the length of time that the final motion score must remain less than the stable counter threshold before the algorithm determines if a refocus is required. For example, the stable counter threshold may be set to 8 (corresponding to the time associated with capturing 8 consecutive frames). The value of the stable counter may be selected to allow the scene to stabilize (e.g., to allow auto-exposure statistics to stabilize). The stable counter threshold may be configured with a larger value (e.g., tens or hundreds of frames) to prevent excessive lens refocusing. For a scene with two time periods of significant motion separated by a short time period of stability (e.g., a time period of stability corresponding to a number of captured frames that is less than the stable counter threshold), a large stable counter threshold may prevent processing module 28 from performing a lens refocus process (as an example). The stable counter threshold may be configured with a smaller value (e.g., less than ten frames) to prevent excessive delay in lens refocusing. At time t5, processing module 28 may determine that the scene has stabilized and configure autofocus module 32 to perform lens refocusing, if required by a significant change in the sharpness score.

Some scenes may not require lens refocusing. In the example of FIG. 6B, sharpness scores are illustrated for a scene that may require lens refocusing. Before time t10, the scene may be stable and the sharpness scores may be constant or nearly constant. At time t10, the scene may change (e.g., due to motion) and the sharpness score may decrease (e.g., due to motion blur).

At time t11, the amount of motion in the scene may decrease and the sharpness scores for the scene may increase (e.g., due to decreasing motion blur).

At time t12, the scene may stabilize (e.g., there may be no motion in the scene), and the scene sharpness score may be a constant value (e.g., reflective of a stable scene). The new stable sharpness score may be different (e.g., lower due to an inappropriate lens configuration) from the stable score before motion began at time t10. The difference between the new stable sharpness score and the original stable sharpness score may indicate that the new stable scene is significantly different from the previous stable scene. As a result, the algorithm may order a refocus operation to bring the scene into focus.

FIG. 6C illustrates a scenario in which a new stable sharpness score (e.g., a sharpness score at time t17) is of similar magnitude to an old sharpness score (e.g., a sharpness score at time t15). This may indicate that the scene has not changed despite a detection of motion (e.g., due to camera motion or some disruption in the scene). In the scenario of FIG. 6C, refocus may not be performed.

Figure 7:
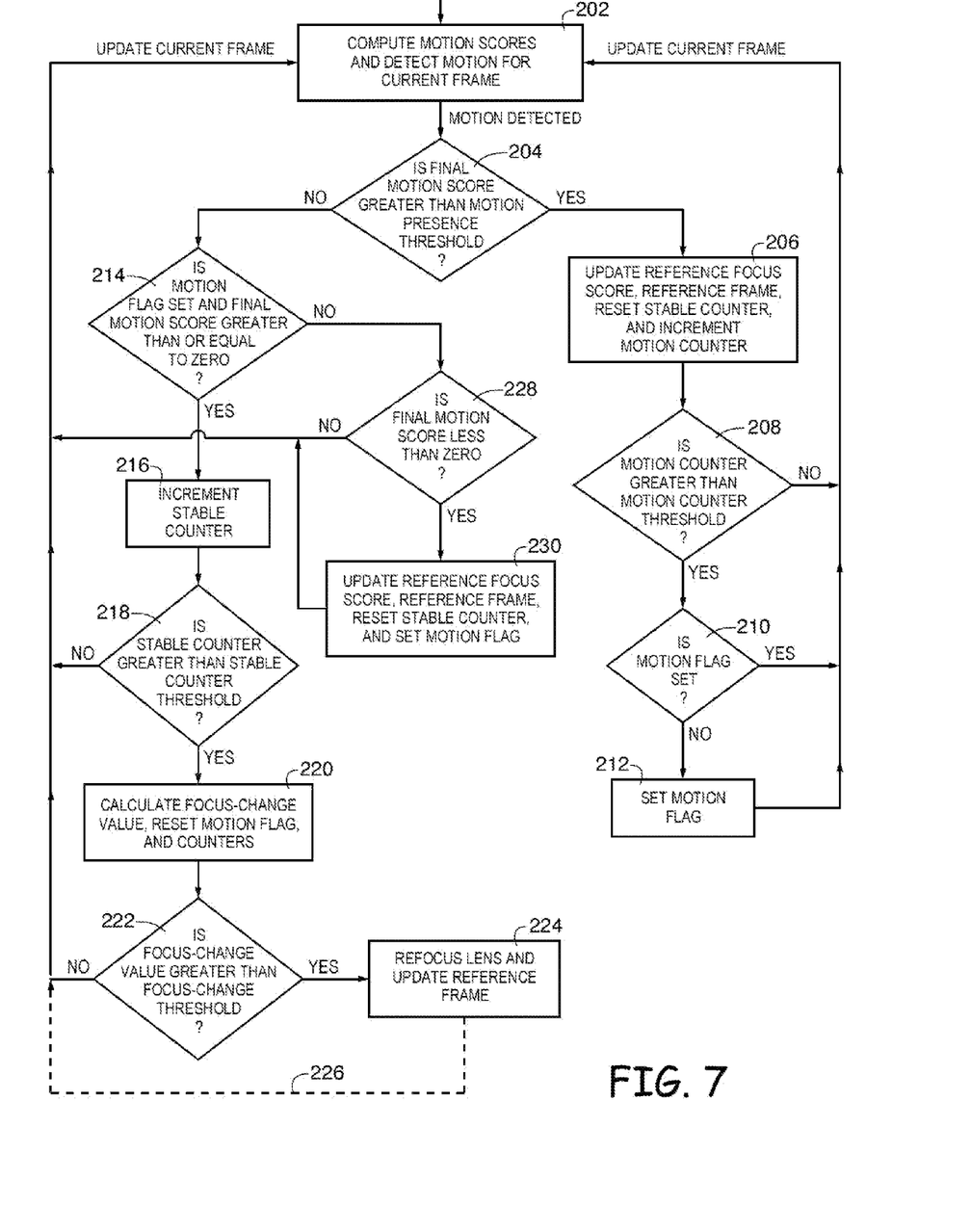
FIG. 7 is a flow chart of illustrative steps involved in determining when to perform a lens re-focus procedure in accordance with an embodiment of the present invention.

The flow chart of FIG. 7 shows illustrative steps involved in performing the scene-change detection algorithm using circuitry such as image processing circuitry 16 that may contain a processing module 28, a motion detection module 30, and an autofocus module 32.

During the operations of step 202, motion detection module 30 may calculate motion scores (e.g., directional motion scores, reference motion scores, and a final motion score) and detect motion (e.g., significant motion) using the calculated motion scores for a current captured frame and convey the results to processing module 28 (e.g., via path 36). The motion scores may be calculated using auto-exposure statistics (e.g., average zone luminance values) generated by image processing circuitry 16 for the current frame. If motion is detected, image processing circuitry 16 may perform the operations of step 204.

During the operations of step 204, processing module 28 may identify whether the final motion score is greater than a motion presence threshold. The motion presence threshold may be selected to increase or decrease motion sensitivity (e.g., responsiveness to motion scores in a sequence of image frames) of the algorithm. For example, a larger motion presence threshold may be selected to decrease the motion sensitivity and a smaller motion presence threshold may be selected to increase the motion sensitivity. If processing module 28 identifies that the final motion score is less than the motion presence threshold, the operations of step 214 are performed. If processing module 28 identifies that the final motion score is greater than the motion presence threshold, the operations of step 206 may be performed.

During the operations of step 206, processing module 28 may update a reference focus score (e.g., a sharpness score calculated using the reference frame), update the reference frame, reset a stable counter, and increment a motion counter. The reference focus score reflects the focus score of the last still frame (e.g., the reference focus score may be updated to correspond to a focus score for the last frame without motion).

Focus scores of recent frames may be stored using a sliding window buffer with entries corresponding to sharpness scores of previous frames. For example, a sliding window buffer of size four may store four sharpness scores that have been calculated for four previous frames. The size of the buffer may be chosen to accommodate an estimate of the number of frames required for a final motion score to exceed the motion presence threshold after motion is detected in a scene (e.g., the size of the buffer may be chosen so that a focus score calculated for the most recent still frame is stored in the buffer). If desired, the reference focus score may be stored as a single value equal to the maximum value among focus scores measured after a recent refocus operation.

During the operations of step 208, processing module 28 may identify whether the value of the motion counter exceeds a motion counter threshold. If the motion counter is greater the motion counter threshold, the operations of step 210 may be performed. If the motion counter is less than the motion counter threshold, the process may loop back to step 202.

During the operations of step 210, processing module 28 may identify whether a motion flag is set. If the motion flag is set, processing may update the current frame (e.g., to the next captured frame) and loop back to step 202. If the motion flag is not set (e.g., the motion flag is zero or false), the operations of step 212 may be performed.

During the operations of step 212, processing module 28 may set the motion flag to reflect that motion of sufficient magnitude and duration has occurred (i.e., that the final motion scores for a consecutive number of frames exceeding the motion counter threshold have each been greater than the motion presence threshold). Processing may then update the current frame and loop back to step 202.

During the operations of step 214, processing module 28 may identify whether the motion flag is set and whether the final motion score for the current frame is greater than zero. If the final motion score for the current frame is less than zero or the motion flag is not set, processing moves to step 228. If the final motion score is greater than zero and the motion flag is set, the operations of step 216 may be performed.

During the operations of step 216, processing module 28 may increment a stable counter. The stable counter may correspond to the number of frames with insignificant motion (i.e., final motion scores less than the motion presence threshold) that are captured after the motion flag is set. For example, the stable counter may correspond to a number of frames captured after time t4 in the example of FIG. 6A.

During the operations of step 218, processing module 28 may identify if the value of the stable counter is greater than a stable counter threshold. The stable counter threshold may determine the number of required still frames following an assertion of the motion flag before a lens refocusing may be performed. In other words, the stable counter threshold may reflect the amount of time allowed for image processing circuitry 16 to stabilize following a detection of motion with sufficient magnitude and duration. If the stable counter is less than the stable counter threshold, the current frame is updated (e.g., to the next captured frame) and processing loops back to the step 202. If the stable counter is greater than the stable counter threshold, the operations of step 220 may be performed.

During the operations of step 220, processing module 28 may calculate a focus-change value, reset the motion flag and reset the counters (e.g., the motion counter and the stable counter). The focus-change value may correspond to the difference between the reference focus score stored during the operations of step 212 and the focus score of the current frame. For example, the focus-change value may be equal to the absolute value of the difference between the reference focus score and the current focus score.

During the operations of step 222, processing module 28 may identify if the focus-change value is greater than a focus-change threshold. The focus-change threshold may determine the minimum difference (e.g., a minimum difference percentage) in focus scores between the reference frame (e.g., the frame corresponding to the reference focus score) and the current frame. As an example, in a scene with a person sitting on a chair, the person may stand up and then sit down. The motion corresponding to the person standing and then sitting may cause the motion flag to be set (i.e., the motion may be of sufficient magnitude and duration). After the person sits back down, the stable counter may be incremented until its value exceeds the stable counter threshold. However, in this case, the difference in focus scores between the reference frame and the current frame may be minimal (e.g., the person may be sitting in the same position before and after standing up). In this scenario, the original lens configuration may produce captured images with sufficient sharpness (i.e., the lens may not need to be refocused). If the focus-change value is less than the focus-change threshold, the lens may not need to be refocused, the current frame may be updated, and processing may loop back to step 202. If the focus-change value is greater than the focus-change threshold, then the lens may need to be refocused to accommodate a scene change between the reference frame and the current frame, and the operations of step 224 may be performed.

During the operations of step 224, processing module 28 may configure autofocus module 32 to perform autofocus functions (e.g., processing module 28 may convey control signals to autofocus module 32 via path 38 that configure autofocus module 32 to refocus the lens. After the autofocus functions are completed (e.g., after the lens is refocused), image processing circuitry 16 may perform continuous autofocus functions (i.e., continuously detect when the camera lens requires refocusing and perform appropriate actions) by updating the reference frame with the current frame, storing appropriate focus scores for future reference, and returning to step 202 via dotted line 226.

During the operations of step 228, processing module 28 may determine whether the final motion score is less than zero (e.g., regardless of whether or not the motion flag is set). If the final motion score is less than zero, the scene may correspond to a special case of an object moving towards or away from the lens. Such a situation may require a refocus even if motion were to last for just one frame, and the operations of step 230 may be performed. If the final motion score is greater than or equal to zero, the process may update the current frame and loop back to step 202.

During the operations of step 230, the reference focus score may be updated (e.g., using the values stored in a sliding window buffer or using a stored maximum sharpness score), the reference frame may be updated with the current frame, the stable counter may be reset, and the motion flag may be set.

Figure 8:
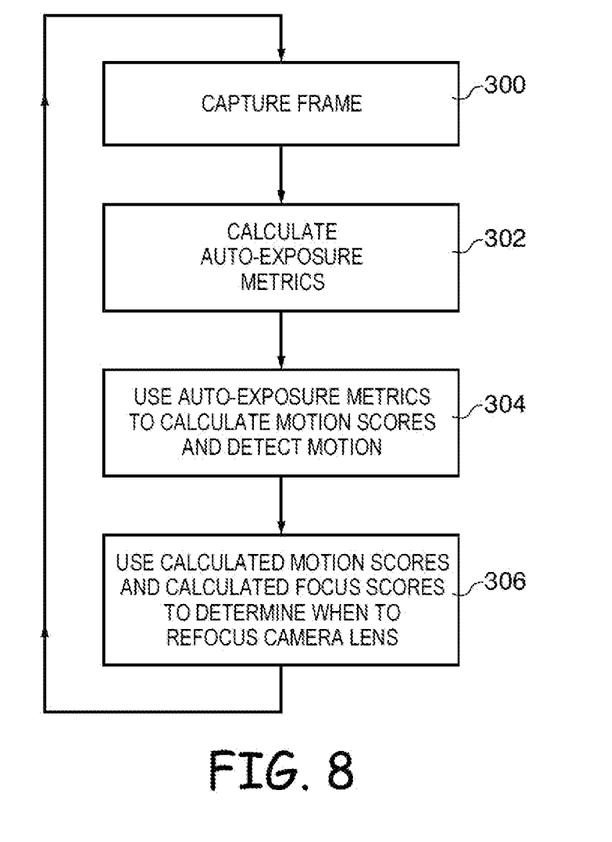
FIG. 8 is a flow chart of illustrative steps involved in determining when to re-focus a lens based on auto-exposure metrics in accordance with an embodiment of the present invention.

The camera motion recognition (CMRA) algorithm may be used with any suitable auto exposure metric (e.g., average zone luminance values, brightness values, etc). The flow chart of FIG. 8 shows illustrative steps for continuous autofocus functions using the CMRA algorithm with a suitable auto exposure metric.

During the operations of step 300, a frame may be captured (e.g., by camera sensor 14 of a camera module 12).

During the operations of step 302, suitable auto-exposure metrics may be calculated (e.g., average zone luminance metrics, brightness metrics, etc).

During the operations of step 304, the calculated auto-exposure metrics may be used to calculate motion scores and to detect motion (e.g., motion scores may be calculated from average zone luminance metrics and brightness metrics based on shifted sum of absolute difference calculations and significant motion may be detected using the calculated motion scores).

During the operations of step 306, the calculated motion scores and detection of motion may be used to determine when to refocus a camera lens (e.g., the calculated motion scores may be monitored to identify motion of sufficient magnitude and duration and appropriately adjust a camera lens associated with camera sensor 14).

Various embodiments have been described illustrating systems and methods for detecting motion and/or changes in the scene in order to trigger autofocus functionality.

Imaging systems may include image sensor arrays for capturing images and may include image processing circuitry. The image processing circuitry may perform functionality such as calculating auto exposure metrics, determining focus scores, and determining when to perform autofocus functions.

A window within a captured image may be divided into rectangular zones (e.g., sub-blocks). Auto exposure metrics (e.g., average luminance values, brightness values, etc.) may be calculated for each zone. The calculated auto exposure metrics may be used to identify directional motion (e.g., by calculating shifted sum of absolute difference (SSAD) values for sequential frames, calculating motion scores based on the SSAD values, and identifying directional motion based on the motion scores).

Motion scores calculated from the auto exposure metrics may be used to determine when to perform autofocus functions. For example, to determine when to refocus a lens for a continuous autofocus application, the motion scores may be monitored to identify motion with sufficient magnitude and duration. After identification of motion, the motion scores may be used to determine when a given scene has stabilized and when the lens is ready to be refocused (e.g., the lens may be refocused when the motion scores are stable). The decision to refocus the lens could be based on the change in a focus metric such as a sharpness score.

The foregoing is merely illustrative of the principles of this invention which can be practiced in other embodiments.

What is claimed:

1. A method, comprising:
   focusing incident light on a pixel array with a lens;
   capturing a sequence of images with the pixel array;
   with image processing circuitry, calculating statistical metrics from the captured sequence of images;
   calculating a motion score based on the statistical metrics; and
   determining when to refocus the lens based at least partly on the motion score, wherein determining when to refocus the lens based at least partly on the motion score comprises:
      incrementing a motion count that is indicative of how many images from the sequence of images have a motion score that is greater than a first threshold;
      in response to identifying that the motion count is greater than a second, motion counter threshold, incrementing a stable count that is indicative of how many images from the sequence of images have a motion score that is less than the first threshold.

2. The method defined in claim 1, wherein determining when to refocus the lens further comprises identifying a reference image from the sequence of images.

3. The method defined in claim 2, wherein determining when to refocus the lens further comprises identifying that the stable count is greater than a third threshold.

4. The method defined in claim 3, wherein determining when to refocus the lens further comprises:
   calculating a focus-change value based on a focus score of the reference image and a focus score of a given image from the sequence of images; and
   identifying that the focus-change value is greater than a fourth threshold, the method further comprising:
      in response to identifying that the focus-change value is greater than the fourth threshold, refocusing the lens.

5. A method for identifying motion from a first image and a second image using image processing circuitry, comprising:
   calculating a first set of values associated with automatic exposure metrics of the first image;
   calculating a second set of values associated with automatic exposure metrics of the second image;
   calculating a first set of motion scores based on differences between the values in the first set of values and the values in the second set of values, wherein each motion score of the first set of motion scores is associated with a direction of motion;
   calculating a third set of values associated with automatic exposure metrics of a third image;
   calculating a second set of motion scores based on differences between the values in the second set of values and the values in the third set of values, wherein each motion score of the second set of motion scores is associated with a direction of motion;
   identifying motion in a first direction based on the first set of motion scores;
   identifying motion in a second direction based on the second set of motion scores;
   identifying that the first direction is equal to the second direction; and
   in response to identifying that the first direction is equal to the second direction, refocusing a lens.

6. The method defined in claim 5 wherein calculating the first set of values comprises calculating zone luminance values.

7. The method defined in claim 5 wherein calculating the first set of motion scores comprises:
   forming a first subset from the first set of values and a second subset from the second set of values; and
   calculating a motion score based on a difference between a sum of differences between the first subset and the second subset.

8. The method defined in claim 5 further comprising:
   identifying a highest motion score from the first set of motion scores;
   identifying a second-highest motion score from the first set of motion scores; and
   calculating a final motion score based on the highest motion score and the second-highest motion score.

9. The method defined in claim 8 further comprising:
   identifying that the final motion score exceeds a motion threshold.

10. The method defined in claim 9 further comprising:
    identifying a direction of motion associated with the final motion score.

11. The method defined in claim 5 further comprising:
    calculating a first sharpness score from the first image;
    calculating a second sharpness score from the second image; and
    calculating a difference between the first and second sharpness scores, wherein refocusing the lens comprises refocusing the lens in response to identifying that the difference is greater than a threshold value.

* * * * *